United States Patent [19]

Hayes

[11] 4,034,912
[45] July 12, 1977

[54] METHOD AND CONTROL ARRANGEMENT FOR A HEATING SYSTEM INCLUDING SOLAR AND FUEL-FIRED HEATING APPARATUS

[75] Inventor: Thomas Edward Hayes, Goshen, Ind.

[73] Assignee: Johnson Controls, Inc., Milwaukee, Wis.

[21] Appl. No.: 693,523

[22] Filed: June 7, 1976

[51] Int. Cl.² .................. F24J 3/02; F24D 11/00
[52] U.S. Cl. .......................... 237/1 A; 126/400; 126/271; 237/8 R
[58] Field of Search ............... 237/1 A, 8 R, 55; 126/270, 271, 400; 122/20 B; 219/279; 236/91 A, 91 F, 68 R

[56] References Cited
U.S. PATENT DOCUMENTS

| 3,894,685 | 7/1975 | Keyes et al. | 237/1 A |
| 3,902,474 | 9/1975 | Pyle | 237/1 A |
| 3,977,601 | 8/1976 | Bearzi | 237/8 R |

Primary Examiner—William E. Wayner
Attorney, Agent, or Firm—Johnson, Dienner, Emrich & Wagner

[57] ABSTRACT

A method and control arrangement for a heating system including solar heating apparatus and a conventional fuel-fired heating apparatus wherein heat load of the heating system and solar heating source capability are compared, and the heating system is switched to solar heating whenever the heating capability of the solar heating apparatus exceeds the heat load of the system, the heating system being switched to the conventional heating apparatus only when the heat load exceeds the heating capability of the solar heating apparatus. The control arrangement includes a first sensor which provides a first output indicative of heat load for the system as indicated by average fuel consumption by a burner of the conventional heating apparatus or the duty cycle of a thermostat of the system, a second sensor which provides a second output indicative of the temperature of a solar heated medium, and a controller which responds to the first and second outputs to provide heat for the system from the solar heated medium whenever possible. In one embodiment, the controller includes a differential temperature sensing device, and in a second embodiment, the controller includes a microprocessor system.

38 Claims, 6 Drawing Figures

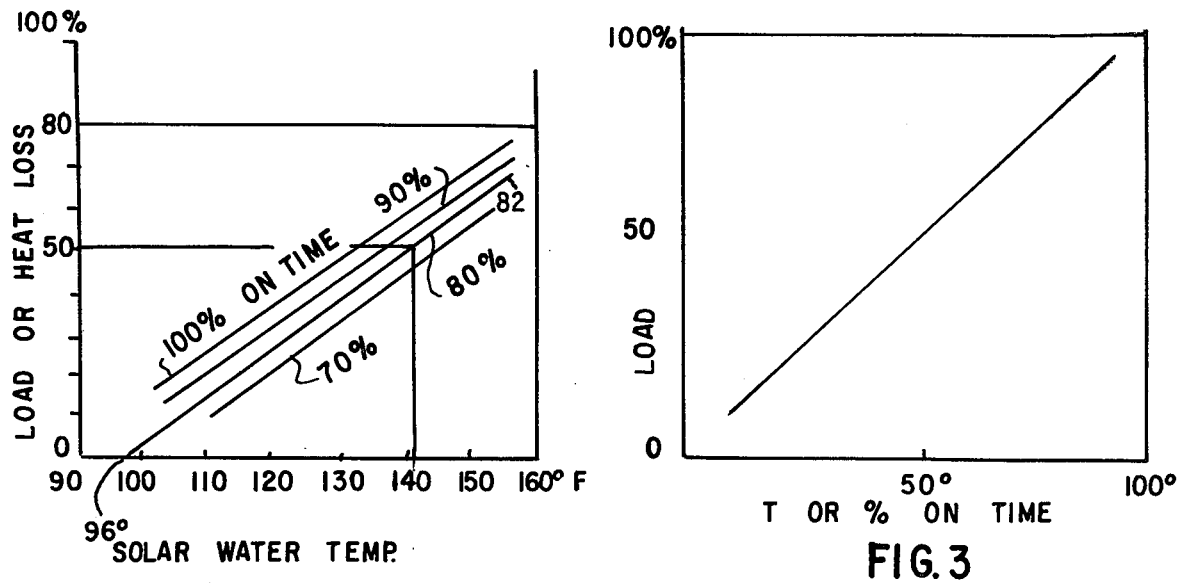
FIG. 2
FIG. 3
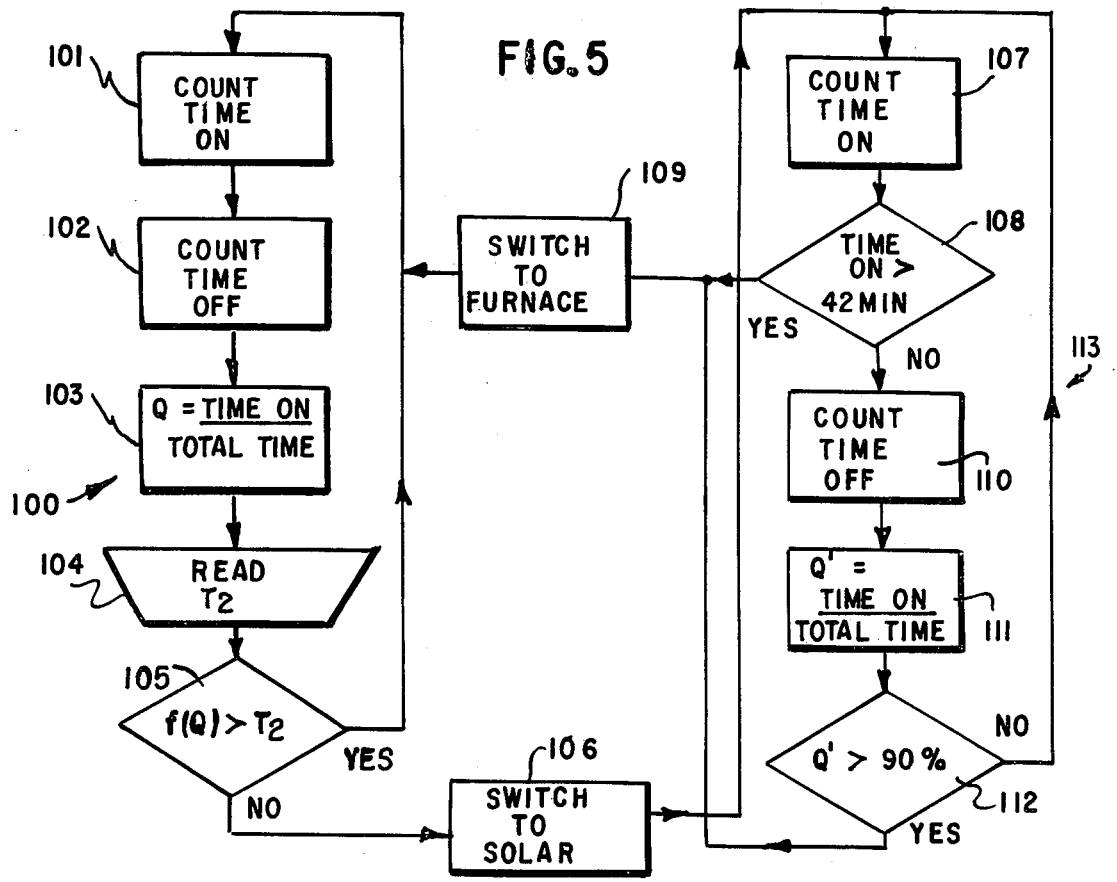
FIG. 5
MICROPROCESSOR FLOW CHART FOR SOLAR + FURNACE

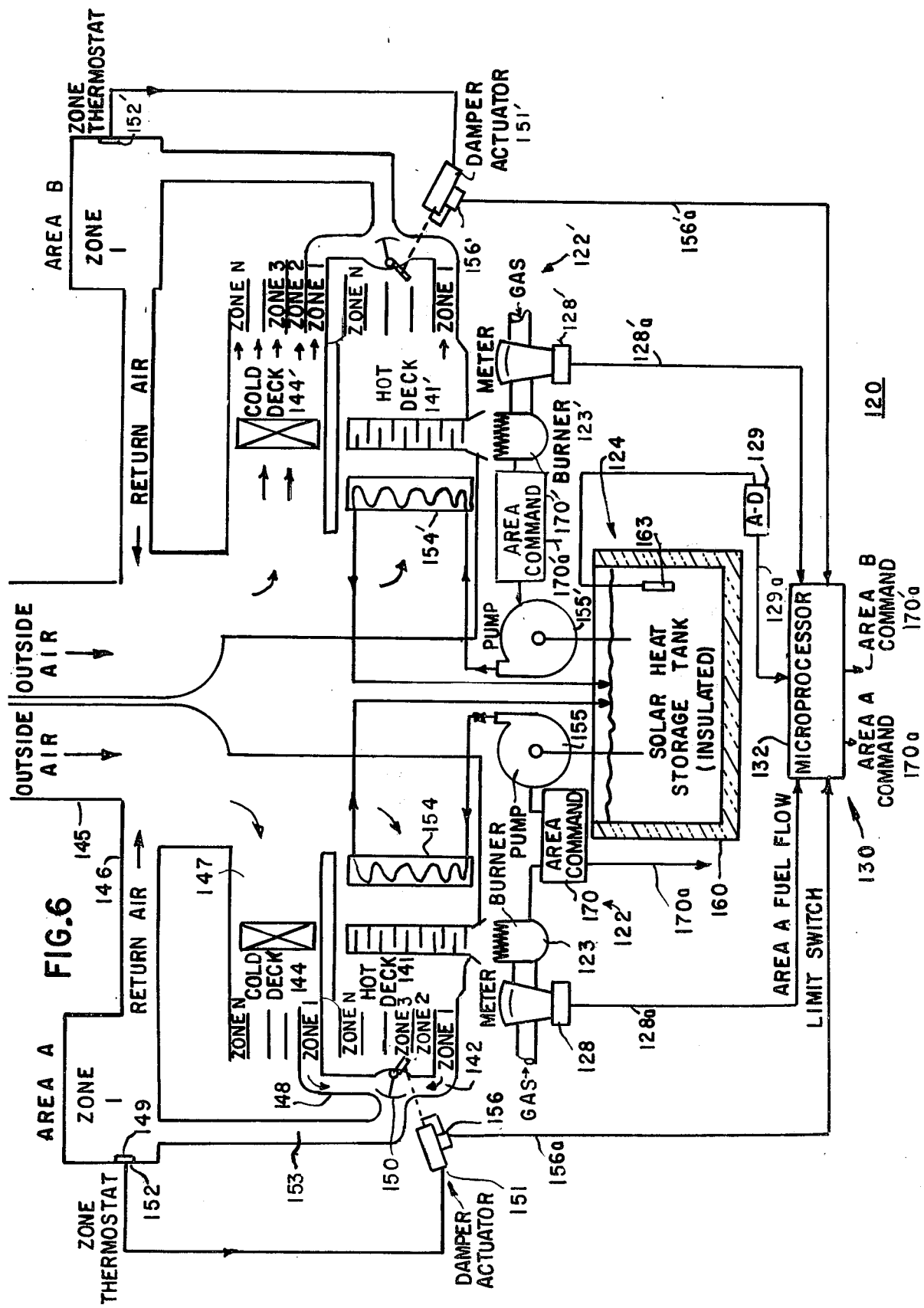

METHOD AND CONTROL ARRANGEMENT FOR A HEATING SYSTEM INCLUDING SOLAR AND FUEL-FIRED HEATING APPARATUS

BACKGROUND OF THE INVENTION

1. Field of the Invention

This invention relates to heating systems, and more particularly to a method and apparatus for controlling conventional heating apparatus and solar heating apparatus of a heating system to enable the use of solar heating whenever possible.

2. Description of the Prior Art

Various heating systems employing solar energy have been proposed as a way of conserving fuel and minimizing heating costs. However, in most areas of the country, there can be sufficiently long periods of deep cold weather with no solar input. Thus, it is recognized that a heating system utilizing 100 percent solar energy is not economically practical. On the other hand, a heating system using solar energy for 40 to 70 percent of the total annual heat requirements is feasible if such heating system has a source, other than solar, capable of supplying 100 percent of the maximum heating requirements when necessary. Thus, the combination of a conventional heating system with solar heat supplement is one probable heating method for the future.

Efficient operation of the combination of a solar heating system with a conventional heating system depends upon using solar energy whenever possible, and automatically switching to heat from the conventional heating source only when solar heat is inadequate to meet system heating requirements. This dictates a need for establishing criteria for switching from solar heat to furnace heat and from furnace heat to solar heat.

The need to switch from solar heat to furnace heat can be determined from the load requirements for the system. That is, assuming the system is employing solar heating, then if a demand for heat exists for a long duration, say 60 minutes or more, or if a demand for heat is being provided 90 percent of the time, the solar source is very nearly inadequate to satisfy the heating demand. Accordingly, a decision to switch to the conventional heating system is in order. Thus, switching from solar heating to conventional heating apparatus can be effected by monitoring the load requirements of the system.

The problem of switching from furnace heat to solar is more complex in that solar water temperature is not a sufficient changeover criterion. For example, it is possible to supply the heating requirement in mild weather with solar water at a relatively low temperature such as 115° F. It is also possible that the solar water temperature could rise, during several clear days, to 150° F in relatively cold weather and that this 150° F water temperature would adequately supply the heat requirement. Accordingly, efficient use of solar heating requires a method for comparing heat load with solar source capability.

Therefore, it would be desirable to have a way of controlling apparatus of a combined solar and conventional heating system which enables the use of solar heating whenever possible, and which automatically switches to the conventional heating apparatus only when the solar heating source is inadequate to meet system heating requirements.

SUMMARY OF THE INVENTION

The present invention has provided a method and a control arrangement for a heating system which enables the use of solar energy in a conventional heating system whenever possible, and which permits automatic switching to heat from a conventional heating source whenever solar heat is inadequate to meet system heating requirements.

The heating system, which may be employed in a domestic or commercial building, includes a fuel-fired heating apparatus having a burner operable when energized to supply heat to a first medium, and circulating means operable when energized to circulate said medium through areas of the building for heating said areas. The heating system further includes solar heating apparatus including storage means for storing a second medium, and means for heating said second medium through solar energy.

In accordance with the present invention, a method for enabling medium heated by the solar apparatus to supply heat to the areas of the building comprises determining the heat load for the heating system during a given period, determining the heating capability of the solar heating apparatus and disabling the burner of the conventional heating apparatus and causing the first medium to be heated by the solar heated medium whenever the heating capability of the solar heating apparatus exceeds the heating demand of the system.

In disclosed embodiments, the heat load of the system may be determined by monitoring fuel consumption by the burner and averaging the fuel consumption over a given period of time. Alternatively, the heat load of the system may be determined by monitoring the on-time of a thermostat of the system, and determining the percent of time the thermostat is operated during a given time interval which is indicative of the duty cycle of the thermostat. Solar heat source capability may be determined by sensing the temperature of the solar heated medium.

The decision to switch from the conventional heating source to the solar heating source is made by comparing the heating capability of the solar heat source, as indicated by the temperature of the solar heated medium, with the heating requirements of the system, as indicated by average fuel consumption or the duty cycle of the thermostat. Whenever the heating capability of the solar heating source exceeds the system heating requirements, the heating system is switched to the solar heat source. Conversely, whenever the system heating requirements exceed the heating capability of the solar heating source, the system is switched to the conventional heating source.

A control arrangement provided by the present invention for enabling the first medium to be heated selectively by the burner or the solar heated medium prior to being circulated through areas of the building comprises first sensing means for providing a first output indicative of the heat load for the heating system, second sensing means for providing a second output indicative of the heating capability of the solar heating apparatus, and controller means including comparator means responsive to the first and second outputs for providing a control output whenever the second output is greater than the first output. A switching means is responsive to the control output to disable the burner and to enable the first medium to be heated by the solar heated medium prior to circulation through the areas of the building.

In accordance with one embodiment, the first sensing means includes means heated in response to operation of the thermostat to provide a temperature that is indicative of the duty cycle of the thermostat, which temperature is sensed by a first temperature sensor. The second sensing means includes a second temperature sensor which senses the temperature of the solar heated medium. The comparator means includes a mechanical changeover switch which is responsive to outputs of the first and second sensors to enable the switching means to switch the system from conventional heating to solar heating whenever the temperature sensed by the second temperature sensor exceeds the temperature sensed by the first temperature sensor. A further switch, controlled by the first sensing means, effects disabling of the switching means to switch the system from solar heating to conventional heating whenever the duty cycle of the thermostat exceeds a predetermined value, such as 90 percent, for example.

In accordance with a second embodiment, the controller means includes a microprocessor system which responds to a first input, provided as a contact closure effected by the thermostat, to obtain percentage on time of the thermostat, or heat loss for the heating system. The microprocessor system compares the heat loss with a further input representing the temperature of the solar heated medium, and effects switching from conventional heating to solar heating whenever the heating capability of the solar source exceeds the heat loss of the system. The microprocessor system switches back to conventional heating whenever the solar source is inadequate and the duty cycle of the thermostat exceeds 90 percent.

The above embodiments are most suitable for use in heating systems which employ a single cycling thermostat and a single conventional heating unit. In heating systems for commercial buildings, for example, more than one heating plant, typically of the forced air type, may be used, each of which supplies both heating and cooling requirements for one or more zones of the building. Each of the zones is generally controlled by a zone thermostat which commands a hot and cold deck mixing damper. Proportional type thermostats are used in controlling the heating requirements for each of the zones.

In a third embodiment for use in commercial heating systems of the type described above, the controller means comprises a microprocessor system which receives a first input representing average fuel flow to a burner of the heating unit, indicative of the load level, and a second input representing the temperature of the solar heated medium which may be employed to supplement the conventional heating apparatus. The microprocessor system effects switching from the conventional heating apparatus to the solar heating apparatus whenever the temperature of the solar heated medium is greater than the load level, and switches back to the conventional heating whenever the temperature of the solar heated medium decreases to a level that is inadequate to meet the load level.

An end switch on the damper actuator for each zone provides a further input to the microprocessor system which enables switching from solar heating to conventional heating whenever the zone damper for a given zone is maintained in a full heat position for a predetermined time, indicating that the solar heating source is inadequate.

DESCRIPTION OF THE DRAWINGS

FIG. 2 illustrates the relationship between the load, or heat loss, and temperature of solar heated medium required to supply the load at several percentages of "on time" for a thermostat of the system;

FIG. 3 shows the relationship between heat load and "percent on time" for apparatus of the system shown in FIG. 1;

FIG. 5 is a microprocessor flow chart for the controller apparatus of FIG. 4; and FIG. 6 is a simplified representation of a commercial heating system employing solar heating apparatus and conventional heating apparatus and a solid state controller provided in accordance with a third embodiment of the invention.

DESCRIPTION OF PREFERRED EMBODIMENTS

Figure 1:
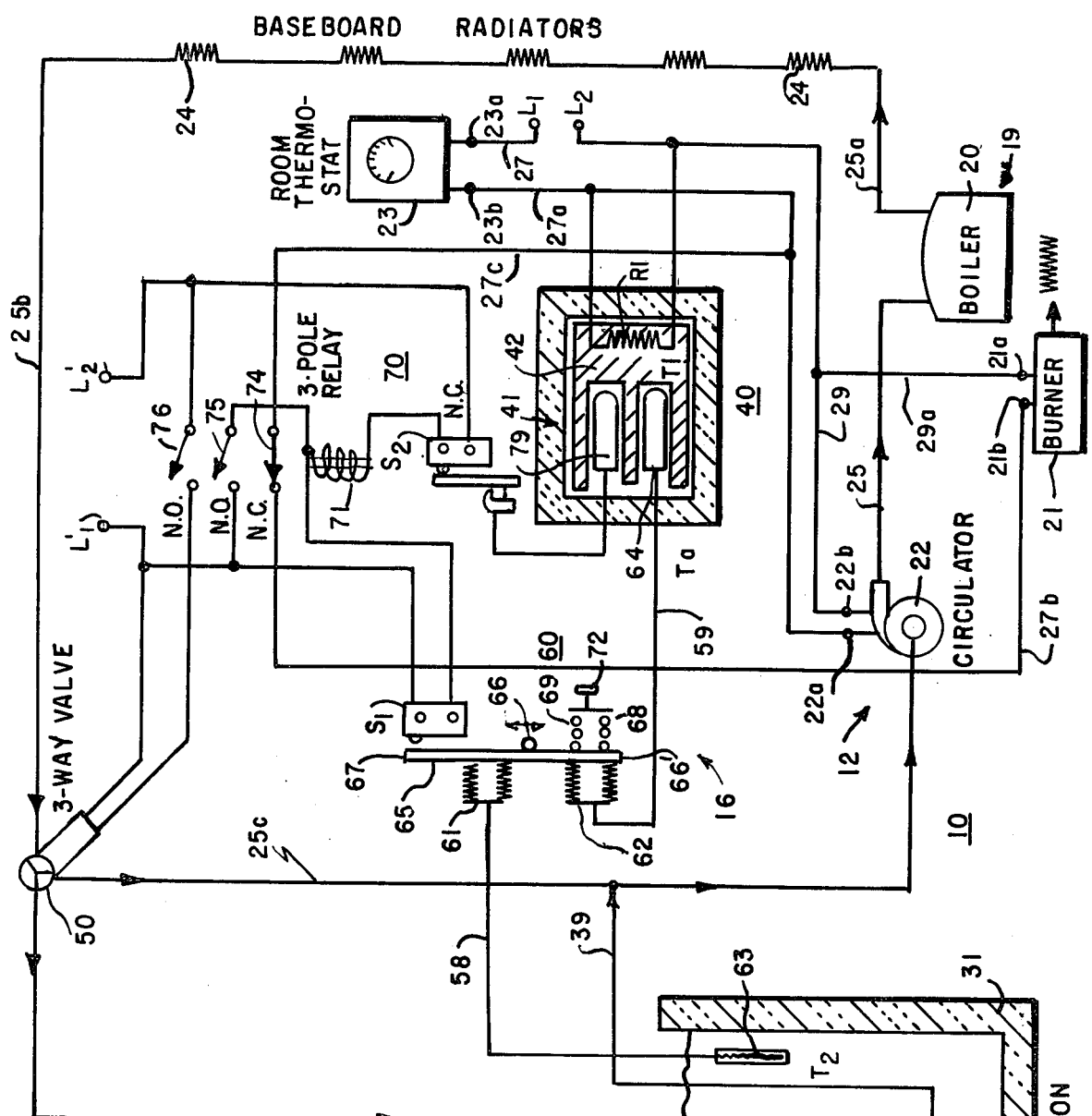
FIG. 1 is a simplified representation of a heating system including solar heating apparatus and hydronic heating apparatus and a controller provided in accordance with one embodiment of the invention.
Figure 1:
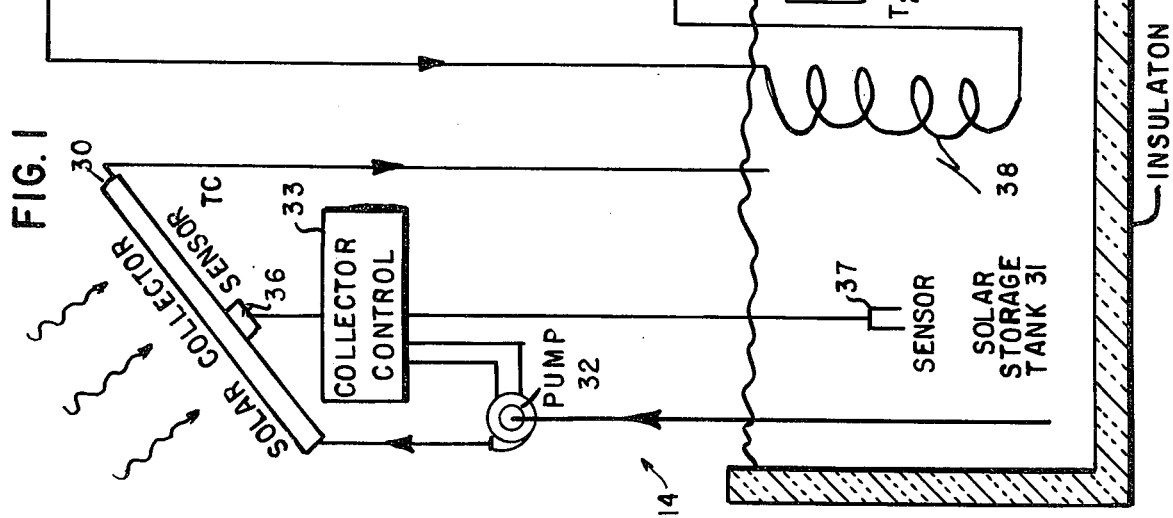

Referring to FIG. 1, there is shown a simplified representation of a heating system 10 for providing heat for a building, such as a residence or a small commercial building. The heating system 10 includes conventional heating apparatus 12, solar heating apparatus 14 and a controller 16 provided in accordance with one embodiment of the invention which enables the use of solar energy for heating the building whenever possible and which switches to the conventional heating apparatus 12 when solar heat is inadequate to meet the heating requirements for the building.

In the exemplary embodiment, the conventional heating apparatus 12 comprises a hydronic heating system including a furnace 19 and a water circulator 22. The circulator 22 is energized in response to the operation of a thermostat 23 to circulate heated water over hot water lines 25 to baseboard radiators 24 located within rooms of the building. The furnace 19 includes a boiler 20 and a gas or oil fired burner 21 energized upon operation of the thermostat 23 in response to a request for heat to supply heat to the boiler for heating water supplied to the boiler 20 over water line 25 from the circulator 22.

The thermostat 23, which is located in one of the rooms of the building, is connected in a series circuit with the circulator 22 to a power source at terminals L1 and L2, which are connectable to a 120 VAC source. One terminal 23a of the thermostat 23 is connected over a conductor 27 to terminal L1. Another terminal 23b of the thermostat 23 is connected over a conductor 27a to a terminal 22a of the circulator 22 which has a further terminal 22b connected over a conductor 29 to terminal L2.

The burner 21 has a terminal 21a connected over conductor 29a to conductor 29, which is connected to terminal L2, and a further terminal 21b connected over conductor 27b, normally closed contacts 74 of a relay 70 of the controller 16 and conductor 27c to conductor 27a which is connected to terminal L1 over the thermostat 23.

Whenever the hydronic heating apparatus 12 is enabled by the controller 16 to respond to the thermostat 23 to provide heat, then, when the thermostat 23 operates in response to a decrease in ambient temperature from the value to which the thermostat 23 is set, the burner 21 is energized over conductors 27 and 27a, contacts 74, conductors 27b, 29a and 29, which supplies heat to the boiler 20. In addition, the circulator 22 is energized over conductors 27, 27a and 29 to circulate water through the boiler 20 and the baseboard radiators 24 over hot water lines 25.

The solar heating apparatus 14 includes a heat source, embodied as a solar heat collector 30, a heat sink, which is an insulated storage tank 31, a pump 32 and a collector control 33. The solar heat collector 30 may be an array of solar connector panels typically located on the roof of the building to be exposed to solar energy.

The pump 32 is operable when energized to circulate a medium, such as water, from the solar heat storage tank 31 through the solar collector 30 to be heated in the solar collector 30 by solar energy. The medium thus heated is then returned to the storage tank 31, raising the temperature T2 of the medium stored therein. The collector control 33 monitors the temperature Tc at the solar collector 30 as indicated by temperature sensor 36 and the temperature T2 of the medium in the solar storage tank 31 as indicated by a further sensor 37 and controls the operation of the pump 32 in accordance with the difference in such temperatures. The collector control 33 energizes the pump 32 to enable circulation of the medium through the solar heat collector 30 and to the storage tank, thereby raising the storage tank temperature whenever the temperature at the solar collector 30 is such as to assure that the medium circulated therethrough can be heated sufficiently to add heat to the portion of the medium in the storage tank 31. The collector control 33 keeps the pump 32 off at all other times. It is pointed out the solar collector panel 30 along with the collector pump 32 and control 33 is not connected in any way to the conventional heating system 12, and operates as an independent control loop.

Whenever the temperaure T2 of the medium in the storage tank 31 is high enough to permit the use of solar heating, the controller 16 effects the operation of a three way valve 50, permitting water supplied to the inlet of the valve 50, represented by line 25b, at the outlet of the baseboard radiators to be circulated through a heat exchanger 38 disposed within the storage tank 31. The valve 50, which may be the Type V70BC-1, commercially available from Penn Controls, Inc., a division of Johnson Controls, Inc., is deenergized when furnace heating is employed to direct hot water supplied to the valve inlet directly to the circulator over line 25c.

The water circulated through the heat exchanger 38 is heated to the temperature T2 of the medium stored in the storage tank 31 and returned to the circulation line as indicated at 39 for recirculation through the baseboard radiators 24.

The circulation of the water through the heat exchanger 38 is controlled by the circulator 22 which is energized in response to operation of the thermostat 23, the burner 21 being maintained deenergized when solar heating is employed through the operation of relay 70 which interrupts the energizing circuit for the burner 21.

Referring to the controller 16 which effects the changeover from solar to furnace heating or the reverse, the operation of the valve 50 is controlled by the relay 70, which also effects interruption of the energizing circuit to the burner 22 over contacts 74 whenever solar heat is being used. The operation of relay 70 is in turn controlled by a changover switching apparatus 60 which responds to an input provided provide over conductor 58 by a temperature sensor 63 in tank 31, indicative of solar heat capability, and an input supplied over conductor 59 by a sensing apparatus 40, indicative of heat load for the heating system 10. Inputs indicative of solar capability and heat load are used to enable switching from furnace to solar heat inasmuch as solar water temperature alone is not sufficient changeover criteria. For example, it is possible to supply the heating requirement in mild weather with solar water at a relatively low temperature such as 115° F. It is also possible that the solar water temperature could rise (during several clear days) to 150° F in relatively cold weather and that this 150° water would adequately supply the heat requirement. Thus, it is seen that solar water temperature alone is not a sufficient changeover criterion.

Thus, switching from furance heat to solar heat requires a method for comparing heat load with solar source capability. The percent of total time during which the thermostat 23 is on, is a fairly accurate measure of load or heat loss of the heated space. The thermostat 23 is a conventional room thermostat with self heating (anticipation) set for a cycling rate of 6 cycles per hour and 50 percent on time or duty cycle. This cycling rate is largely due to the self heating. The thermostat 23 automatically adjusts its duty cycle for percentage on time to maintain the temperature within narrow limits. When the heat loss is great, as in cold, windy weather, the percentage of time the thermostat 23 is calling for heat is large. Conversely, in mild weather, the thermostat 23 is on only a small percent of the total time.

For the purpose of measuring of the percentage on time of the thermostat 23, the sensing device 40 is controlled by the thermostat 23 to provide an output indicative of the percent on time of the room thermostat 23. The sensing device 40 includes an insulated box 41 in which is disposed a heat sink block 42. A heating resistor R1 is disposed within the box 41 in contact with the block 42. The resistor R1 is connected in parallel with conductors 27a and 29 and thus in series with the thermostat 23, to be energized whenever the thermostat 23 is operated in response to a request for heat, providing heat to the heat sink block 42.

The resistance R1 is sized to result in some reasonable maximum temperature rise for the block 42 above ambient temperature Ta of the controlled space, such as 100° F, when the heater resistance R1 is energized 100 percent of the time. The sensing device 40 is located in the controlled space which is maintained at a constant temperature Ta, typically 70° F, through operation of the thermostat 23 which effects energization of the heating apparatus whenever the area temperature decreases below the desired temperature Ta for the controlled space. The average internal temperature T1 within the insulated housing 41 is then a measure of the heating load. The thermal time constant of the metal block 42 and the insulation member 41 is chosen to be over 50 minutes. Therefore, the change of temperature T1 within the insulated housing 41 during a given 10 minute cycle is small and may be on the order of 5°. At an 80 percent on time for the thermostat 23, the temperature rise of T1 averages 80° F. Similarly, a 20 percent on time of thermostat 23 causes an average rise of 20° F of temperature T1 over the ambient temperature TA of the controlled space.

Switching from furnace heat to solar heat, requires a method for comparing heat load with solar source capability. From the design of the building and its calculated heat loss, a relationship between solar water temperature T2 and heat load can be derived. FIG. 2 illustrates the relationship between load or heat loss and the solar water temperature T2 required to supply the load at several percentages of on time for the thermostat 23. Note that a very high and probably unobtainable medium temperature, greater than 160° F, is required to supply a load of 80 percent, but a medium temperature T2 of 110° to 120°, which is normally available through most of the spring and fall mild weather, is capable of supplying loads up to aproximately 25 percent.

The relationship between load and temperature T1, or on time for the thermostat 23, as measured by sensing device 40 as previously described, is shown in FIG. 3, which indicates, for example, that for a 50 percent load, the thermostat 23 experiences a 50 percent on time and the temperature T1 within the housing 41 experiences a 50° F rise above ambient.

The percentage-on time (or T1) represents heating load only when the furnace is supplying the heat. Because the furnace is a fixed source, for a given heat loss, there is a fixed percentage on time required to supply it. This is clearly not true of the solar source. The temperture T1 within the housing 41 and the temperature T2 of the storage tank 31 are monitored by the switching apparatus 60 which provides suitable control outputs for enabling the solar heating apparatus 14 to supply heat to the system 10 whenever possible.

The switching apparatus 60 is comprised of two vapor-charged bellows 61 and 62 controlled by associated temperature sensors 63 and 64, sensor 63 being located within the solar storage tank 31 and sensor 64 being positioned within the insulating member 41. Sensor 63 monitors the temperature T2 of the medium in the solar heat storage tank 31 and controls the expansion and contraction of bellows 61 in accordance with the sensed temperature. Similarly, sensor 64 monitors the temperature T1 within the insulated member 41 and controls the expansion and contraction of bellows 62 as a function of the temperature within housing 41. The bellows 61 and 62 exert a force on a lever member 65 which varies in proportion to changes in the temperatures T1 and T2. The lever 65 rides on a movable fulcrum 66, the position of which is set to provide a desired ratio of T1 temperatures and T2 for normal temperature ranges, such as 75° to 175° for the temperature T1, within housing 41, and 90° to 140° for the temperature T2 of the medium in the tank 31.

A bias means 68, including a spring 69 and a manual adjust screw 72, is disposed adjacent one end 66' of lever 65 to supply a bias force to the lever member 65 to offset the force of bellows 62 and to enable preselection of the maximum duty cycle at which the switch 60 response to enable the use of solar heating.

A micro-switch S1, having normally open contacts, is operated by the other end 67 of the lever member 65, when the lever forces balance and reach switching level to energize relay 70 which effects deenergization of the burner and energization of the three-way valve 50, permitting water to be circulated through the heat exchanger 38 in the solar storage tank 31.

Relay 70 has a relay operating coil 71 having one end connected over normally open contacts of switch S1 to power terminal L1' and its other end connected over normally closed contacts of a switch S2 to power terminal L2'. The terminals L1' and L2' are connected to a 120 VAC source. The relay 70, which is a three pole relay, is energized whenever switch S1 is operated to open contact 74 to interrupt the enerigizing path for the furnace burner 21, and to close contact 76 to energize the valve 70. In addition, contact 75 closes, providing a holding path for the operate coil 71 of the relay 70, insuring that the switch back from solar heat to burner heat is controlled only by the controller switch S2.

Switch S2 is controlled by an associated temperature sensing bulb 79 which is located within the insulated housing 41, and is operated to drop out the relay 70 whenever the temperature T1 within the insulated housing 41 increases 90° over ambient, which occurs only when the room thermostat 23 calls for heat 90 percent of the time. If the room thermostat 23 is calling for heat 90 percent of the time, then the solar source 14 is nearly inadequate to satisfy the demand and switch S2 effects switching to furnace heat.

With reference to FIG. 1, in operation, the solar heating apparatus 14 is operable independently of the conventional heating system 12 to circulate the medium in the storage tank to the collector 30 for heating by solar energy directed toward the collector 30. The heated medium as returned to the storage tank 31 increases the temperature of the medium in the solar storage tank 31.

By way of example, it is assumed that the heating system 10 is on furnace heat and a clear day occurs in relatively cool weather, the furnace 12 may be cycling at 50 percent on-time that is T1 = 50° F, to maintain the ambient temperature Ta at a set value, such as 70° F. Accordingly, temperature T1 is Ta + T1 = 125°. As the solar input raises the temperature T2 of the medium, a point is reached where the solar source 14 can supply the load at a cycling duty cycle of possibly 80 percent on-time.

Referring to FIG. 2, assuming the bias spring 69 of changeover switch 60 is set to a duty cycle of 80 percent, represented in FIG. 2 as the line 82, then for a 50 percent load, a temperature T2 for the medium in the tank 31 of 142° F is required for operation of the changeover switch 60.

Referring to FIG. 1, as temperature T2 incease, bellows 61 expands in response to the temperature increase sensed by sensor 63, and when the temperature T2 in the solar storage tank 31 reaches 142° F, bellows 61 has expanded sufficiently to move lever arm 65, counteracting the force of bellows 62, to operate switch S1 which closes, completing an energizing path to relay 70 which then operates to provide a changeover from furnace heat to solar heat.

When relay 70 operates, contacts 74 open to interrupt the energizing path for the burner 21, contacts 75 close to provide a holding path for the relay operate coil 71 and contacts 76 close to energize valve 50, enabling water circulated through the system to be directed to the heat exchanger 38 in the solar storage tank 31 for heating by the medium stored therein. The water is directed to the heat exchanger 38 under the control of the circulator 22, which is energized whenever thermostat 23 is operated. The heated water is then returned to the normal flow path at point 39 and is circulated through hot water lines 25 to the baseboard heaters 24 and thence returned to the solar heat storage tank 31 for reheating as long as the thermostat 23 maintains the circulator 22 operated.

As indicated above, the temperature T1 represents loading only when the furnace is supplying heat. Thus, in the event of an increase in heat loss, while the temperature T2 remains at 142° F, the duty cycle or on-time of the heating system may exceed 90 percent. The continued operation of the thermostat 23 causes heating of resistance R1 which raises the temperature T1 within housing 41, 90° F above the ambient temperature Ta. At such temperature, as sensed by sensor 79, switch S2 operates, interrupting the energizing path for relay 70 which releases, deenergizing valve 50 to bypass the solar heating system 14 and to energize the furnace 21.

When the temperature T1 decreases to a value less than 90° F over the ambient temperature, the relay 70 may be reenergized provided the solar water temperature T2 is high enough to maintain switch S1 operated. In the event the temperature T2 of the solar heated medium drops below 142° F, bellows 61 contracts, disabling switch S1. However, relay 70 remains energized until the duty cycle exceeds 90 percent at which time switch S2 operates, deenergizing the relay 70 which switches the heating system from solar heat to furnace heat as described above.

Although the illustrative embodiment shown in FIG. 1 employs a hot water heating apparatus as the conventional heating system, it should be obvious that the principles of operation herein described are equally applicable to a forced hot air system wherein the system is supplemented with solar heat by circulating solar heated medium through a finned heat exchanger in the furnace plenum.

SECOND EMBODIMENT

Figure 4:
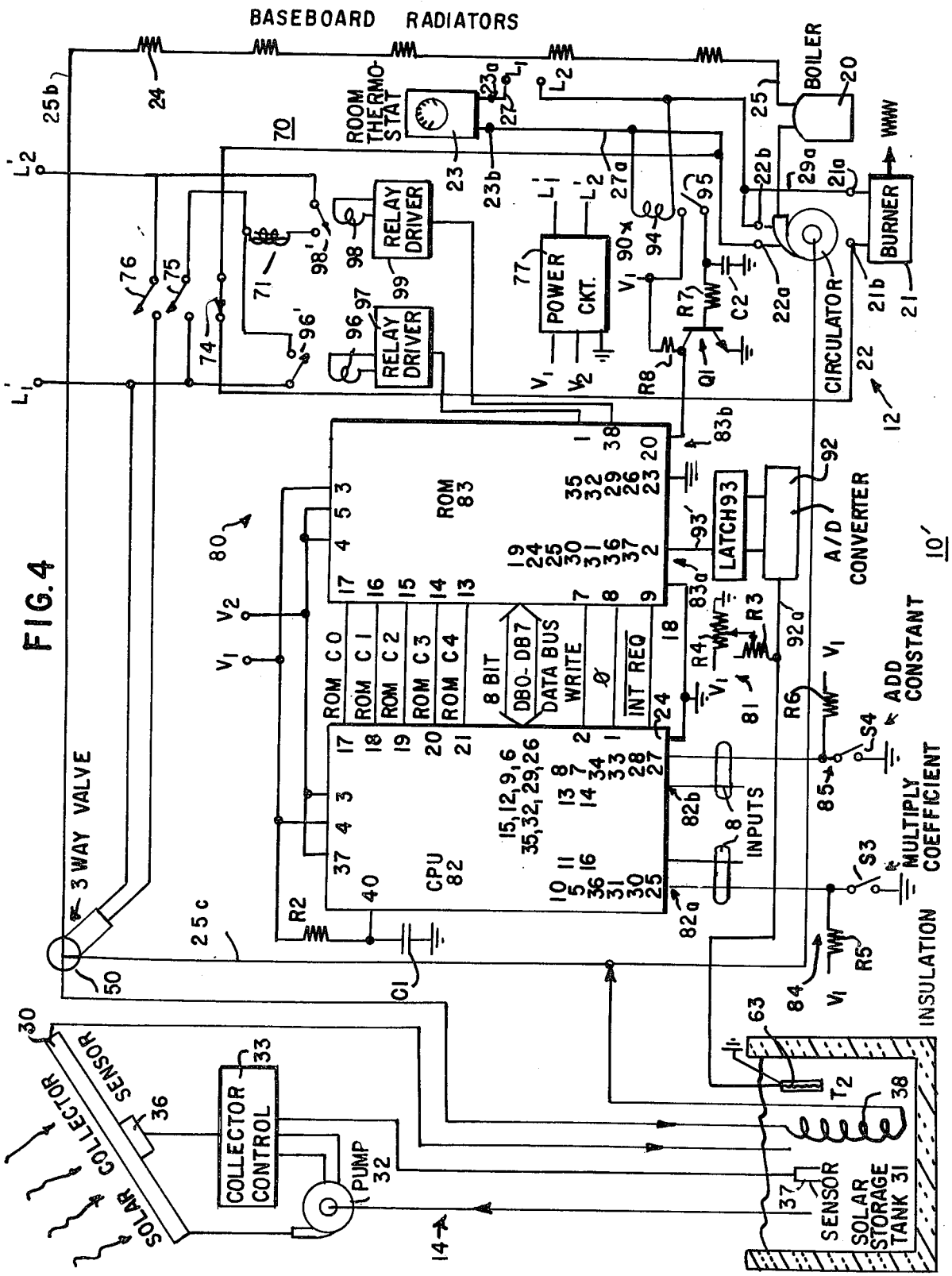
FIG. 4 is a simplified representation of a heating system including solar heating apparatus and hydronic heating apparatus and a solid state controller, including a microprocessor, provided in accordance with a second embodiment of the invention.

Referring to FIG. 4, there is shown a simplified representation of a heating system 10' employing conventional heating apparatus 12 and solar heating apparatus 14 and an electronic controller 80 provided in accordance with a second embodiment of the invention. The conventional heating apparatus 12 and the solar heating apparatus 14 employed in the heating system 10' are identical to those shown in FIG. 1, and accordingly, like reference numerals have been given to corresponding elements in FIG. 4.

The controller 80 includes a microprocessor system 81 such as the type F8 Microprocessor commercially available from Fairchild or Mostek, Inc., which includes a central processing unit or CPU 82 and a read only memory or ROM 83, and associated input/output devices which permit reception and storage of input data prior to processing by the microprocessor under program control, and the provision of control outputs indicative of conditions monitored by the controller 80.

Briefly, the CPU 82 controls the entire microprocessor operation and executes functions called for by instructions of a program stored in the ROM 83, which also stores data for use by the CPU 82.

Power is supplied to the CPU 82 and the ROM 83 from a power circuit 77, which is connected to power lines L1' and L2' and derives voltages at levels V1 and V2, which may be 12VDC and 5VDC, respectively, from the AC power signal.

A resistor R2 and a capacitor C1, which are connected to timing inputs at pins 4 and 40 of the CPU 82, determine the timing of the internal clock. In the present example, the maximum count period is 39 milliseconds, and the CPU 82 is programmed to count $2^{16}$, or about 43 minutes as a maximum on-time, providing a 0.2 MHz clock rate for the system 81.

The CPU 82 communicates with the ROM 83 over five control lines ROM C0-ROM C4, an eight-bit data bus DB0-DB7, and clock lines WRITE and $\phi$. An interrupt request control line $\overline{INT\ REQ}$ is connected between the ROM 83 and the CPU 82. In addition, the CPU 82 has two eight-bit input/output ports 82a and 82b, which are used to supply input data in the form of multiplication and addition factors for use by the CPU 82. Such factors may be established through the use of resistor/switch arrangements 84 and 85 by selectively closing only one of the eight switches of each switch set S3 and S4 to select the desired slope and intercept point as shown in FIG. 2. The ROM 83 also has two eight-bit input/output ports 83a and 83b over which the input data is received and the control outputs are provided.

The inputs to the microprocessor system 81 over the ROM 83 include a signal proportional to the temperature T2 of the medium stored in the storage tank 31, and a contact closure provided by a reed switch 90 indicative of the on-time of the thermostat 23. The temperature sensor 63 which senses the temperature T2 of the storage tank 31 provides a voltage proportional to the temperature T2 which is extended to an input 92a of an analog-to-digital converter 92, which is maintained at a reference level by way of calibration potentiometers R3 and R4. The A–D converter 92 converts the input level to a digital word in a format suitable for the microprocessor. One example of an A–D converter suitable for this purpose is Burr Brown ADC-50 -08 BIN which converts the sensor output to an eight-bit BCD word which is stored in a latch 93. The eight outputs of the latch 93, represented by line 93' are connected to inputs of the eight-bit I/0 port 83a of ROM 83 of microprocessor system 81, for storage until called for by the CPU 82.

The reed switch 90 includes an operate coil 94 having one terminal connected to power terminal L2 and a second terminal connected over thermostat 23 to power terminal L1 and is energized to close normally open contacts 95 of the relay 90 whenever the thermostat 23 is on. The contacts 95 of the reed switch 90 control the enabling of a transistor Q1, to provide a ground level at the collector of transistor Q1 whenever the relay 90 is operated and a voltage of level V1 whenever the relay 90 is disabled.

The collector of transistor Q1 is connected to one terminal at pin 20 of the eight input I/0 port 83b of the ROM 83, which has further terminals at pins 1 and 38 connected to relay drivers 97 and 99 for controlling the operation of relays 96 and 98 in accordance with the status of control bits stored in the ROM 83. The remaining five terminals of I/O port 83b are connected to ground.

Briefly, the microprocessing system 81 times the closures of the contacts 95 of reed switch 90, representing thermostat operation, and divides the "on" time by total cycle time to obtain percentage-on time or heat load during furnace firing. The microprocessor system 81 then compares heat load with the temperature T2 and effects switching of the system 10′ to solar heat whenever possible. The microprocessing system 81 effects switching of the system 10′ back to furnace heat whenever the solar heating source 14 is inadequate or the on-time for the thermostat 23 has exceeded 90 percent.

The functions of the microprocessor system 81 are effected through the operation of relays 96 and 98 over associated relay drivers 97 and 99 to enable the use of solar heating for the system 10′. Relay 96, which corresponds to switch S1 of the system 10 shown in FIG. 1, is operable to close normally open contacts 96′]to connect one side of the operate coil 71 to power terminal L1′. Relay 98, is maintained energized whenever the duty cycle is less than 90 percent, normally connecting the other side of operate coil 71 to power terminal L2′ to permit energization of relay 70 upon operation of relay 96. Relay 98, which corresponds to switch S2, (FIG. 1) effects disabling of relay 70 whenever a 90 percent duty cycle is achieved for the heating system 10′ to bypass the solar heating apparatus 14 and to energize the furnace 21 to provide heating of the water.

The operation of the microprocessor system 81 is best described with reference to the microprocessor flow chart shown in FIG. 5, which illustrates control loops 100 and 113 for conventional heating and solar heating conditions, respectively. Assuming initially the heating system 10′ is operating with furnace heat, at blocks 101–102, the microprocessor 81 times the closures of contacts 95 which represent thermostat operation time for a given period of time and at block 103 provides a factor Q which is the ratio of time on to total time and represents the duty cycle for the heating system 10′.

Then at block 104, the CPU 82 reads the temperature T2 stored in the ROM 83, as provided by the A–D converter 92′ compares the factor Q with the temperature T2 (block 105) and maintains the conventional heating apparatus 12 operable whenever the factor Q is greater than temperature T2, indicative of a condition where solar heating would be inadequate to supply the system heating requirements.

Whenever the factor Q is less than the temperature T2, the heating requirements for the heating system 10′ can be supplied by the solar heat. Accordingly, the CPU 82 sets a bit in the ROM 83 causing pin 1 of I/O port 83b to go high, which enables relay 96 (FIG. 4) over relay driver 97. Since relay 98 is normally maintained operated by an output provided at pin 38 of ROM I/O port 83b whenever the heating system duty cycle is less than 90 percent, relay 70 is operated, and the heating system 10′ is switched to solar heat (block 106). When relay 70 operates, the energizing path for the burner 21 is interrupted, and the valve 50 is energized, permitting hot water to be circulated by the circulator 22 through the heat exchanger 38 in the storage tank 37 for heating by the medium stored therein prior to recirculation over hot water lines 25 through the baseboard heaters 24. The microprocessor system 81 continuously receives and processes input data indicating the temperature T2 of the medium in the storage tank 31 and the on-time of the thermostat 23, as provided by contact closures of reed switch 90, to maintain relays 96 and 98 operated until solar heating can no longer satisfy the system heating requirements.

Referring to the solar heating control loop 113 illustrated in FIG. 5, at block 107, the microprocessor system 81 counts the on-time for the thermostat 23, and whenever the on-time is greater than 42 minutes, the microprocessor unit 82 effects a switching to furnace heat (blocks 108 and 109) by deenergizing relay 98, causing relay 70 to drop out, returning the system 10′ to furance heating.

Under the condition where the thermostat on-time is less than 42 minutes, relay 98 is maintained operated, and the microprocessor system 81 counts the off-time for the thermostat 23 (block 110) and derives a duty cycle fctor Q′ (block 111) which is compared with a fixed value 90 percent (block 112). Whenever factor Q′ is greater than the fixed value, indicative of solar heating which is inadequate to meet system heating requirements, a switch to furnace heating operation is provided at block 109 as described above. For the condition where factor Q′ is less than the fixed value, solar heating is continued and the sequence of operations represented by blocks 113 is repeated.

One example of an Assembly Language Program for the Type F-8 Microprocessor System for providing the instructions required to effect the control process described above, is set forth in Appendix A. The ROM 83 has sufficient storage area for storing such program instructions.

It is pointed out, that in embodiment shown in FIG. 4 which employs a microprocessor system 81, it is possible to employ a linear electrical sensor for room temperature in place of the thermostat 23 for monitoring room temperature and to provide a program for the microprocessor allowing the microprocessor to control system cycling, changeover, timing, night setback and cooling control for summer.

The control systems described above with reference to FIGS. 1 and 4 provide efficient control for a combination of a solar heating apparatus and conventional heating apparatus in applications, primarily domestic, where a single thermostat 23 is employed and relatively small space is being controlled. A further embodiment, shown in FIG. 6 is provided for commercial or industrial building controls which do not employ a single cycling thermostat and which may have several heating plants.

THIRD EMBODIMENT

Referring to FIG. 6, there is shown a heating system 120 for a commerical building which supplies conditioned air to a plurality of areas, such as areas A and B shown in FIG. 6, each of which includes a plurality of zones, such as zones 1, 2, 3, . . . N for area A. The heating system 120 may include a conventional forced-air type air conditioning apparatus 122 for each area, which is supplemented with solar heat provided by a common solar heating apparatus 124, under the control of an electronic controller 130 including a microprocessor system 132, such as the Fairchild Type F8 microprocessor system.

The air conditioning apparatus 122 for each area includes a fuel fired burner 123 which supplies heat to a hot deck 141 for heating return air supplied thereto over a return air duct 146, and an outside air duct 145 when apropriate. The hot deck 141 communicates with each of the zones, such as zone 1, over individual hot air ducts, such as duct 142 for zone 1.

The apparatus 122 also includes a cold deck 144 which provides cooling of air returned from the zones over the return air duct 146 or outside air supplied over the outside air duct 145 and supplied to an inlet 147 of the cold deck 144. The cold deck 144 communicates with each of the zones, such as zone 1, over individual cool air ducts, such as duct 148 for zone 1. A zone mixing damper 150, including a damper actuator 151, is interposed between outlets of the hot air duct 142 and the cold air duct 148 and an inlet of an air duct 153 which extends to the zone 1. The zone mixing damper 150 is positionable to supply a mixture of warm and cool air to the associated zone, such as zone 1, in accordance with control output supplied to the damper actuator 151 by a zone thermostat 152 which is located in the controlled zone 1.

The solar heating apparatus 124 includes a solar heat storage tank 160 which stores medium which is heated by solar energy by apparatus such as a solar collector under the control of a collector controller in the manner of the solar heating apparatus 14 shown in FIG. 4, for example. In the present embodiment, the medium stored in the storage tank 160 is supplied to a suitable heat exchanger 154 located in the hot deck 141 by way of a pump 155 which is operable when energized to circulate the medium from the solar heat storage tank 160 to the heat exchanger 154 and permit the medium to be returned to the solar heat storage tank 160. The heat exchanger 154 transfers heat from the medium to the hot deck 141 for heating air supplied thereto.

The controlling of the solar heating apparatus 124 is effected by the microprocessor 132 and associated control apparatus, which comprises the controller 130, in a manner generally similar to that described above with reference to the embodiment shown in FIG. 4. However, the zone thermostats generally employed in commercial applications are not cycling on-off types but rather proportional types which generate a signal for use in controlling the zone mixing dampers.

In the exemplary embodiment for the heating system 120 shown in FIG. 6, the measure of heat required is determined through the use of a fuel flow meter 128 which meters fluid flow to a burner 123. The flow meter 128 provides a multibit output word which represents fuel flow to the burner 123. One suitable flow meter is the Type 5C-ER-H, manufactured by Badger Meter Company of Milwaukee, Wis., with a pulse sender, such as the model MSE-2 transmitter commerically available from W. R. Frew Company of Indianapolis, Ind., integrally attached.

If the heat source for a given area of the building is gas fired, the digital readout represents fuel consumption, which, over a fixed time period, can be interpreted as load level. This load level is compared with the heat available from the solar source, as established by the temperature of the medium stored in the storage tank 160 and the heat exchanger flows and temperatures. When the solar heat available exceeds the heat required, the heating system 120 is switched to solar heat via an area command 170, which corresponds to relays 70, 96 and 98 of the system 10'.

The output of the flow meter 128 is connected over conductor 128a to an input of the microprocessor system 132 which receives a second input over conductor 129a from an A-D converter 129, such as the Burr-Brown A-D converter employed in the system 10' of FIG. 4, and which is connected to a temperature sensor 163 located within the solar heat storage tank 160.

A further input of the microprocessor system 132 is connected over conductor 156a to a limit switch 156 associated with the damper actuator 151. A prolonged extreme position, indicative of full heat of the associated zone damper 150 indicates that the heat source is inadequate, and that a switch to the conventional heating apparatus 122 is in order.

The microprocessor system 132 is generally similar to the system 81 shown in FIG. 4. However, the system 120 shown in FIG. 6, includes additional ROM units to provide additional input/output ports for accepting the input words provided by the flow meter 128. In addition, the program set forth in Appendix A may be modified in accordance with principles known in the art for providing the desired control for the microprocessor system 132.

In operation, the microprocessor system 132 continuously monitors the digital output provided by the flow meter 128, and the data word representing the temperature T2 of the solar storage tank 160, as provided by the A-D converter 129. The microprocessor system 132 averages the flow rate to determine a fuel consumption rate indicative of load requirements for the heating system 120, and compares the load requirements with the temperature T2 of the storage tank 160. Whenever the temperature T2 of the storage tank 160 exceeds the heating requirements of the heating system 120, the microprocessor system 132 provides a control output over an area command lead 170a to effect energization of the pump 155 for circulating the heated medium from the storage tank 160 through the heat exchanger 154, supplying heat to the hot deck 141, and for deenergizing the fuel fired burner 123. The controller 130 maintains solar heating until the temperature T2 of the stored medium decreases to a value such that the load rate exceeds the temperature T2, at which time, the microprocessor system 132 effects the deenergization of the pump 155 and reenergizes the fuelfired burner 123.

The microprocessor system 132 as applied to applications in commercial building control can be programmed to monitor and control all the areas in all the zones at one time, and to command the use of solar heat to a selected one or more zones of the zones whenever possible.

APPENDIX A

The following is one example of an Assembly Language Program for the Type F8 Microprocessor of the controller 80 employed in the embodiment shown in FIG. 4.

| Routine Name | Inst. Name | Operand | Comment |
| --- | --- | --- | --- |
| STLOP | CLR | | Set Ton parameter |
| | LR | 4,A | Loop flag |
| | COM | | |
| | LR | 0,A | LSB of Counter |
| | LR | 1A | MSB of counter |
| COUNT | LI | FE | |
| | OUTS | 07 | Start timer |
| | LI | 03 | |
| | OUTS | 06 | Set Interrupt Enable |
| LQOP1 | NOP | | Wait for interrupt |
| | BR | LOOP1 | |
| INTIN | LR | A,4 | If 4 is not zero |
| | BNZ | STOFF | Then branch to ST OFF |
| STON | DS | 0 | Dec counter |
| | BNZ | CHECK | If not zero, check if |
| | LI | FF | thermostat is closed; |
| | LR | 0,A | if zero, reset counter |
| | DS | 1 | and Dec MSB; |
| | BZ | SWITC | if MSB of counter is zero, switch to furnace (T ON>43 min) |

-continued

| Routine Name | Inst. Name | Operand | Comment |
|---|---|---|---|
| CHECK | INS | 05 | Input thermostat condition |
|  | NI | 01 | and mark unwanted bits; |
|  | BNZ | COUNT | if still calling for heat, return and count again |
|  | LI | FF | Set T off loop parameter |
|  | LR | 2,A |  |
|  | LR | 3,A |  |
|  | LR | 4,A |  |
|  | BR | COUNT | Start count |
| STOFF | DS | 2 | Same as STON |
|  | BNZ | CHEC2 |  |
|  | LI | FF |  |
|  | LR | 2,A |  |
|  | DS | 3 |  |
|  | BZ | HOLD | If T Off>42 Min go to hold loop and wait until heat is called for |
| CHEC2 | INS | 05 | If thermo. still not calling for heat. Mask |
|  | NI | 01 |  |
|  | BZ | COUNT | Count again |
|  | CLR |  | Cycle done set PARA for division |
|  | LR | 7,A |  |
|  | LR | A,1 | Get Ton (MSB) and comp which gives number of cycles in count |
|  | COM |  |  |
|  | SRI |  | Divide by 2. This allows T on/2 + T off/2<256 |
|  | LR | 1,A |  |
|  | LR | A,3 |  |
|  | COM |  |  |
|  | SRI |  |  |
|  | AS | 1 |  |
|  | BM | DIVSR | If sum<128, reset so that 2's comp arithmetic can be done |
| DIVCO | COM |  | Generate 2's comp of T on + T off |
|  | INC |  |  |
|  | LR | 5,A |  |
|  | LI | 0,A | Set counter of number of sub. in div to 9 since the first one will generate a 0. This gives 8 significant bits. |
|  | LR | 6,A |  |
| LOOP2 | DS | 6 | Loop counter |
|  | BZ | DIVEN |  |
|  | LR | A,1 | Load dividend |
|  | AS | 5 Sub divisor |  |
|  | BM | MIDIV | If neg, restore dividend and shift in a 0 |
| PLDIV | SL1 |  | Shift dividend 1 place L |
|  | LR | 1,A | Store |
|  | LR | A,7 | Load Quotient |
|  | SL1 |  | Shift 1 place L |
|  | INC |  | Add 1 |
|  | LR | 7,A | Store Q |
|  | BR | LOOP2 | Try next bit |
| MIDIV | LR | A,1 | Shift dividend 1 place L |
|  | SL1 |  |  |
|  | LR | 1,A |  |
|  | LR | A,7 | Shift Q 1 place L |
|  | SL1 |  |  |
|  | LR | 7,A |  |
|  | BR | LOOP2 | Try next bit |
| DIVEN | LR | A,8 | Load furnace/solar flag |
|  | BZ | FOFQ | If zero, go to F (Q) for furnace switching function |
|  | LR | A,7 | For solar compare to 90% on time; and if<90%, next cycle |
|  | CI | E6 |  |
|  | BP | STLOP |  |
| SWITC | CLR |  | Set furnace flag |
|  | LR | 8,A |  |
|  | LI | 80 | Load furnace variable |
|  | OUTS | 05 | Turn on furnace for next cycle and start loop |
|  | BR | STLOP |  |
| DIVSR | SR1 |  | Divide T on and T on + T off by 2 so that 2's comp 2's comp arithmetic will work |
|  | LR | 5,A |  |
|  | LR | A,3 |  |
|  | SR1 |  |  |
|  | LR | 3,A |  |
|  | LR | A,5 |  |
|  | BR | DIVCO |  |
| FOFQ | CLR |  | Set up loop parameter |
|  | LR | 10,A |  |
|  | LR | 11,A |  |
|  | LI | 09 |  |
|  | LR | 6,A |  |
|  | INS | 00 | Get multiplier and store |
|  | LR | 9,A |  |
| MLOOP | DS | 6 |  |
|  | BZ | MDONE |  |
|  | LR | A,9 | Is MS bit a one, if so, add |

-continued

| Routine Name | Inst. Name | Operand | Comment |
|---|---|---|---|
|  | BP | NOADD | multiplicand, if not shift M & P |
|  | LR | A,10 | Load partial product |
|  | AS | 7 | Add multiplicand |
|  | BC | INC11 | If there is a carry, it is necessary to inc. MSB of product |
| RTINC | BP | SL11 | Is MS bit a one, if so |
|  | SL1 |  | Shift LSB and MSB and INC |
|  | LR | 10,A | MSB |
|  | LR | A,11 |  |
|  | SL1 |  |  |
|  | INC |  |  |
|  | LR | 11,A |  |
|  | BR | SL9 |  |
| SL11 | SL1 |  | If MS bit is a 0, shift LSB and MSB but do not Inc MSB |
|  | LR | 10,A |  |
|  | LR | A,11 |  |
|  | SL1 |  |  |
|  | LR | 11,A |  |
| SL9 | LR | A,9 | Shift multiplier to get next bit then return to start of loop |
|  | SL1 |  |  |
|  | LR | 9,A |  |
|  | BR | MLOOP |  |
| INC11 | LR | 10,A | Store LSB of product |
|  | LR | A,11 | Get MSB of product |
|  | INC |  | Inc |
|  | LR | 11,A | Restore |
|  | LR | A,10 | Restore LSB of product |
| NOADD | LR | A,10 | Get LSB of product |
|  | BP | NOINC | If MS bit is 1, shift LSB |
|  | SL1 |  |  |
|  | LR | 10,A | Store LSB |
|  | LR | A,11 | Get MSB |
|  | SL1 |  | Shift MSB |
|  | INC |  | INCMSB |
|  | LR | 11,A | Restore |
|  | BR | SL9 |  |
| NOINC | SL1 |  | Same as above, but w/o inc |
|  | LR | 10,A |  |
|  | LR | A,11 |  |
|  | SL1 |  |  |
|  | LR | 11,A |  |
|  | BR | SL9 |  |
| MDONE | INS | 01 | Get y in F (Q) |
|  | AS | 11 | Add y |
|  | BC | STLOP | If carry F (Q)>T2, to |
|  | LR | 11,A | furnace |
|  | BP | QMIN |  |
|  | INS | 04 | Get T2 |
|  | BP | STLOP | A Minus F (Q) and Pos T2 → F(Q) T2 |
|  | COM |  | sub T2 from F (Q) |
|  | INC |  |  |
|  | AS | 11 |  |
|  | BP | STLOP | A pos∆F (Q)>T2 |
| SWFTS | LI | FF | A Min∆F (Q)<T2 |
|  | LR | 8,A | Set up solar parameter |
|  | LI | 40 | Switch to solar |
|  | OUTS | 04 |  |
|  | BR | STLOP | Start solar loop |
| QMIN | INS | 04 | Get T2 |
|  | BM | SWFTS | If T2 Min T2>F (Q), go to solar |
|  | COM |  | Sub T2 from F (Q) |
|  | INC |  |  |
|  | BM | SWFTS | If minus T2>F (Q), go to solar |
|  | BR | STLOP | If plus stay in furnace mode |
| 0000 | CLR |  | Power on parameter |
|  | LR | 8,A | Set up |
|  | LI | 80 |  |
|  | OUTS | 05 |  |
|  | BR | STLOP |  |
| HOLD | INS | 05 |  |
|  | NI | 01 |  |
|  | BZ | HOLD |  |
|  | BR | STLOP |  |

I claim:

1. In a heating system for a building including fuel-fired heating apparatus having a burner means operable when energized to supply heat to a first medium, and circulating means operable when energized to circulate said heated medium through areas of said building, and solar heating apparatus including storage means for storing a second medium and means for heating said second medium through solar energy, a control arrangement for enabling said first medium to be heated selectively by said burner means and said second medium, said control arrangement comprising first sensing means for providing a first output indicative of the heat load for said heating system, second sensing means for providing a second output indicative of the heating capability of said solar heating apparatus, controller means including comparator means responsive to said first and second outputs for providing a control output whenever said second output is greater than said first output, and switching means responsive to said control output to disable said burner means and to enable said first medium to be heated by said second medium prior to circulation through said areas by said circulating means.

2. A system as set forth in claim 1 wherein said comparator means is operable whenever said first output is at least equal to said second output to control said switching means to permit said first medium to be heated by said burner means.

3. A system as set forth in claim 1 wherein said switching means includes means for maintaining said burner means disabled and for permitting said first medium to continue to be heated by said second medium until the heat load for said system exceeds a predetermined value.

4. A system as set forth in claim 1, wherein said switching means includes a first switch device normally deenergized to permit said first medium to be heated by said burner means, said first switch device being operable when energized to disable said burner means and to enable said first medium to be heated by said second medium, and a second switch device controlled by said comparator means to be deenergized in the absence of said control output and to be energized whenever said control output is provided to energize said first switch device.

5. A system as set forth in claim 4 wherein said first switch device is operable when energized to provide a holding path to permit said first switch device to be maintained energized over said holding path whenever said second switch device is deenergized, said switching means further including a third switch device energized when the heat load for the system exceeds a predetermined value to interrupt said holding path to deenergize said first switch device.

6. A system as set forth in claim 5 wherein said first switch device comprises a relay energized in response to operation of said second switch device to close associated contacts to provide said holding path, said third switch device being operable when energized to open associated contacts which are connected in said holding path to thereby deenergize said relay.

7. A system as set forth in claim 1 which includes heat exchanger means for enabling heat from said second medium to be transferred to said first medium.

8. A system as set forth in claim 7 wherein said heat exchanger means is disposed within said storage means, and wherein said circulating means is enabled by said switching means to circulate said first medium through said heat exchanger means.

9. A system as set forth in claim 7 wherein said heat exchanger means is disposed within a plenum of said fuel-fired heating apparatus, and wherein said solar heating apparatus includes further circulating means enabled by said switching means to circulate said second medium through said heat exchanger means.

10. In a heating system for a building including fuel-fired heating apparatus having a burner means operable when energized to supply heat to a first medium, circulating means operable when energized for circulating said heated medium through areas of said building for heating said areas of the building, and thermostat means in one of said areas and operable to energize said circulator means and said burner means in response to a decrease in the temperature in said one area below a selected value, and solar heating apparatus including storage means for storing a second medium, and means for heating said second medium through solar energy, a control arrangement for enabling said first medium to be heated selectively by said burner means and said solar heating apparatus, said control arrangement comprising first sensing means operable to provide a first output indicative of the percent time for which said thermostat is operated, second sensing means for providing a second output indicative of the temperature of said second medium, switching means normally disabled to permit said burner means to be energized in response to operation of said thermostat means to supply heat to said first medium, said switching means being operable when enabled to disable said burner means and to enble said first medium to be heated by said second medium, and controller means including comparator means responsive to said first and second outputs and operable to enable said switching means whenever said second output is greater than said first output.

11. A system as set forth in claim 10 wherein said comparator means includes control means operable whenever said thermostat means remains operated for a predetermined time to effect the disabling of said switching means.

12. A system as set forth in claim 10 wherein said comparator means includes changeover switch means including a normally disabled switch device, a switch operating member, first actuator means connected to an output of said first sensing means and responsive to said first output to apply a first force to said operating member, second actuator means connected to an output of said second sensing means and responsive to said second output to apply a second force to said operating member to counteract said first force, said operating member being moved to operate said switch device whenever said second force exceeds said first force, said switching means being connected to outputs of said switch device to be enabled whenever said switch device is operated.

13. A system as set forth in claim 12 wherein said changeover switch means includes for selecting the difference between said first and second forces at which said operating member operates said switch device.

14. A system as set forth in claim 12 wherein said changeover switch means includes bias means for applying a bias force to said operating member to offset said first force.

15. A system as set forth in claim 10 wherein said first sensing means includes an insulated chamber, a heat sink member disposed within said chamber, and heating means in said chamber controlled by said thermostat means for supplying heat to said heat sink member as a function of the time for which said thermostat means is operated, whereby the temperature within said chamber is indictive of the time for which said thermostat means is operated.

16. A system as set forth in claim 15 wherein said heating means comprises a resistance device connected across outputs of said thermostat means to be energized whenever said thermostat means is operated.

17. A system as set forth in claim 15 wherein said first sensing means includes a first temperature sensing device disposed within said chamber and operable to provide said first output which is indicative of the temperature within said chamber, said second sensing means including a second temperature sensing device disposed within said storage means and operable to provide said second output which is indicative of the temperature within said storage means, and said comparator means including changeover switch means including a switch device and switch operating means responsive to said first and second outputs to operate said switch device whenever the temperature within said storage means exceeds the temperature within said chamber.

18. A system as set forth in claim 17 wherein said changeover switch means includes means for selecting the ratio of the temperatures within said storage means and said chamber at which said switch device is operated.

19. A system as set forth in claim 18 wherein said changeover switch means includes bias means for selecting the temperature of said chamber which enables said switch device to be operated.

20. A system as set forth in claim 17 wherein said first sensing means includes a further temperature sensing device disposed within said chamber, and a further switch device enabled by said further temperature sensing device whenever the temperature within the chamber reaches a predetermined value to effect disabling of said switching means.

21. A system as set forth in claim 10 wherein said controller means comprises a microprocessor system responsive to said first output to provide first data representing a first value which is indicative of the percentage of time said thermostat means is operated within a given time period and responsive to said second output to provide second data representing a second value which is indicative of the temperature of said second medium, said microprocessor system being operable to compare said first and second data and to provide at least one control output indicative of the difference between said first and second values.

22. A system as set forth in claim 21 wherein said controller means includes a first switching device enabled by a control output of said microprocessor unit provided whenever said second value is greater than said first value to enable said switching means.

23. A system as set forth in claim 21 wherein said controller means includes a second switching device enabled by a control output of said microprocessor system provided whenever said first value exceeds a predetermined amount to disable said switching means.

24. In a heating system for a building including at least one air conditioning unit having fuel-fired heating apparatus including a burner means for heating air supplied to a hot deck of said apparatus for circulation through a plurality of zones of the building over individual air ducts extending thereto, each of said zones have associated damper means disposed within an associated air duct and positionable by an associated damper actuator means to control the amount of heated air supplied to the zone in accordance with a control output provided to said damper actuator means by a zone thermostat located within the zone, and solar heating apparatus including solar storage means which stores a medium, and means enabling said medium to be heated by solar energy, a control arrangement for enabling air supplied to said hot deck to be heated selectively by said burner means and said solar heated medium, said control arrangement comprising monitoring means for providing a first output indicative of fuel usage by said burner means, and thus the heating demand of said system, sensing means for providing a second output indicative of the heating capability of said solar heating apparatus, and controller means responsive to said first and second outputs to interrupt a portion of an enabling circuit for said burner means and for enabling heat from said solar heated medium to heat air supplied to said hot deck whenever the heating capability of said solar heating apparatus exceeds the heating demand of the system.

25. A system as set forth in claim 24 which includes heat exchanger means located within said hot deck, and circulator means enabled by said controller means to circulate said solar heated medium through said heat exchanger means.

26. A system as set forth in claim 25 wherein said controller means is operable to disable said circulator means and to complete said portion of said enabling circuit for said burner means whenever the heating demand of the system is greater than the heating capability of said solar heating apparatus.

27. A system as set forth in claim 24 wherein said monitoring means comprises a fuel flow meter operable to provide said first output which is indicative of fuel usage by said burner means and wherein said sensing means comprises a temperature sensor disposed within said storage means and operable to provide said second output which is indicative of the temperature of the solar heated medium.

28. A system as set forth in claim 27 wherein said controller means includes a microprocessor system responsive to said first output to provide first data representing a first value which is indicative of the quantity of fuel consumed within a given time period, and responsive to said second output to provide second data representing a second value which is indicative of the temperature of the solar heated medium, said microprocessor system being operable to compare said first and second data and to provide at least one control output indicative of the difference between said first and second values.

29. A system as set forth in claim 28 wherein said microprocessor system is responsive to an input indicative of maximum heat to at least one of said zones to effect completing of said portion of said enabling circuit for said burner means and for preventing said solar heating apparatus from supplying heat to said hot deck whenever said input is provided for a predetermined time.

30. A system as set forth in claim 29 wherein said input indicative of maximum heat is provided by a limit switch of the damper actuator means for said one zone.

31. In a heating system for a building, including fuel-fired heating apparatus having a burner means operable when energized to supply heat to a first medium and circulating means operable when energized to circulate said medium through areas of the building for heating said areas of the building, and solar heating apparatus including a storage means for storing a second medium and means for heating said second medium through solar energy, a method for enabling medium heated by said solar heating apparatus to supply heat to said areas of the building, said method comprising determined heat load for said heating system during a given time period, determining the heating capability of said solar heating apparatus, and disabling said burner means and causing said first medium to be heated by said second medium whenever the heating capability of said solar heating apparatus exceeds the heating demand of the system.

32. A method as set forth in claim 31 wherein enabling said first medium to be heated by said second medium includes circulating said first medium through a heat exchanger located with said storage means.

33. A method as set forth in claim 31 wherein enabling said first medium to be heated by said second medium includes circulating said second medium through a heat exchanger located in a flow path for said medium.

34. A method as set forth in claim 31 wherein determining the heating capability of said solar heating apparatus includes sensing the temperature of said second medium.

35. A method as set forth in claim 31 which includes enabling said burner means and preventing said first medium from being heated by said second medium whenever the heating demand of the system exceeds the heating capability of said solar heating apparatus.

36. A method as set forth in claim 31 wherein the heating system includes a thermostat operable to control the energization of at least said burner means, and wherein determining the heat load for the heating system includes monitoring the time the thermostat is operated, and determining the percent of time the thermostat is operated during a given time interval.

37. A method as set forth in claim 36 which includes enabling said burner means and preventing said first medium from being heated by said second medium whenever the thermostat is operated a predetermined percent of the time during said given time interval.

38. A method as set forth in claim 31 wherein determining the heat load for said heating system includes monitoring fuel flow to said burner means, and averaging the fuel consumption by said burner means over a predetermined period of time.

* * * * *

UNITED STATES PATENT OFFICE
CERTIFICATE OF CORRECTION

Patent No. 4,034,912          Dated July 12, 1977

Inventor(s) Thomas Edward Hayes

It is certified that error appears in the above-identified patent and that said Letters Patent are hereby corrected as shown below:

Column 18, line 54, after "includes" insert -- means --.

Column 19, line 1, change "indictive" to -- indicative --.

Signed and Sealed this

Eighth Day of November 1977

[SEAL]

Attest:

RUTH C. MASON
*Attesting Officer*

LUTRELLE F. PARKER
*Acting Commissioner of Patents and Trademarks*